United States Patent
De Castro et al.

(10) Patent No.: US 8,722,007 B2
(45) Date of Patent: May 13, 2014

(54) METHOD FOR PRODUCING CARBON NANOMATERIALS PRODUCED FROM HEAVY OIL

(75) Inventors: Alexandre Taschetto De Castro, Rio de Janeiro (BR); Luiz Depine De Castro, Rio de Janeiro (BR); Adelci Menezes De Oliveira, Rio de Janeiro (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 13/124,772

(22) PCT Filed: Oct. 9, 2009

(86) PCT No.: PCT/BR2009/000314
§ 371 (c)(1),
(2), (4) Date: Apr. 18, 2011

(87) PCT Pub. No.: WO2010/043007
PCT Pub. Date: Apr. 22, 2010

(65) Prior Publication Data
US 2011/0280792 A1 Nov. 17, 2011

(30) Foreign Application Priority Data
Oct. 16, 2008 (BR) ..................................... 0806065

(51) Int. Cl.
*D01F 9/127* (2006.01)
(52) U.S. Cl.
USPC ..................... 423/447.3; 423/445 R; 977/843
(58) Field of Classification Search
USPC ........ 423/447.1–447.3, 445 B; 977/742–754, 977/842–848, 773, 891
See application file for complete search history.

(56) References Cited

U.S. PATENT DOCUMENTS

| 6,565,971 B2 * | 5/2003 | Morita et al. ................. 428/367 |
| 7,160,531 B1 | 1/2007 | Jacques et al. |
| 2003/0161950 A1 * | 8/2003 | Ajayan et al. .............. 427/249.1 |
| 2005/0053542 A1 * | 3/2005 | Harutyunyan ............. 423/447.3 |
| 2005/0287064 A1 * | 12/2005 | Mayne et al. ............. 423/445 B |
| 2007/0140947 A1 * | 6/2007 | Schneider et al. ......... 423/447.3 |
| 2008/0107587 A1 * | 5/2008 | Yumura et al. ............. 423/447.3 |

FOREIGN PATENT DOCUMENTS

| JP | 2006-248817 | * | 9/2006 | .............. C01B 31/02 |
| JP | 2006-248817 A | | 9/2006 | |
| WO | 2007/074506 A1 | | 7/2007 | |

OTHER PUBLICATIONS

Qian, et al., Non-catalytic CVD preparation of carbon spheres with a specific size, Carbon 2004; 42: 761-766.*
Machine translation of JP 2006-248817 to Kidena, et al., 8 pages.*

(Continued)

Primary Examiner — Daniel C McCracken
(74) Attorney, Agent, or Firm — Sughrue Mion, PLLC

(57) ABSTRACT

The present invention relates to a method for producing carbon nanoparticles employing heavy petroleum as a carbon precursor, obtained from decant oil, by using the technique of chemical vapor deposition (CVD), and optionally by using an organometallic catalyst that is soluble in the carbon precursor. The main feature of the method according to the invention is that the precursor is vaporized in a controlled manner so as to provide pulses of vapor of constant composition inside a tubular furnace which can be arranged in a vertical position for the continuous production of nanomaterials or in a horizontal position for batch production.

4 Claims, 5 Drawing Sheets

(56) References Cited

OTHER PUBLICATIONS

Jian-Ying Miao, et al., "Synthesis and properties of carbon nanospheres grown by CVD using Kaolin supported transition metal catalysts", Carbon, 2004, pp. 813-822, vol. 42.

Hai-Sheng Qian, et al., "Non-catalytic CVD preparation of carbon spheres with a specific size", Carbon, 2004, pp. 761-766, vol. 42.

Xuguang Liu, et al., "Deoiled asphalt as carbon source for preparation of various carbon materials by chemical vapor deposition", Fuel Processing Technology, 2006, pp. 919-925, vol. 87.

Yi Zheng Jin, et al., "Large-scale synthesis and characterization of carbon spheres prepared by direct pyrolysis of hydrocarbons", Carbon, 2005, pp. 1944-1953, vol. 43.

Mukul Kumar, et al., "Synthesis of Conducting Fibers, Nanotubes, and Thin Films of Carbon From Commercial Kerosene", Materials Research Bulletin, 1999, pp. 791-801, vol. 34, No. 5.

Yongzhen Yang, et al., "Preparation of vapor-grown carbon fibers from deoiled asphalt", Carbon, 2006, pp. 1661-1664, vol. 44.

PH. Serp, et al., "A chemical vapour deposition process for the production of carbon nanospheres", Letters to the editior/Carbon, 2001, pp. 615-628, vol. 39.

Maheshwar Sharon, et al., "Spongy Carbon Nanobeads—A New Material", Carbon, 1998, pp. 507-511, vol. 36, No. 5-6.

* cited by examiner

METHOD FOR PRODUCING CARBON NANOMATERIALS PRODUCED FROM HEAVY OIL

FIELD OF THE INVENTION

The present invention relates to a method for producing carbon nanoparticles from heavy oil fractions as carbon precursor, particularly decant oil by chemical vapor deposition (CVD), and optionally by using an organometallic catalyst that is soluble in the precursor. The main feature of the method is that the precursor is vaporized in a controlled manner so as to provide a pulse of precursor of constant composition inside a tubular furnace which can be arranged in a vertical position for the continuous production of nanomaterials or in a horizontal position for batch production.

RELATED TECHNIQUE

Carbon nanotubes are a new class of materials discovered in 1991 by Sumio Iijima and exhibit extraordinary mechanical, electrical and thermal properties, having the highest tensile strength known, about 200 GPa, 100 times more resistant than the steel and having only one sixth of its density.

Several processes have been developed for the synthesis of these materials, mainly by discharge between graphite electrodes and by Chemical Vapor Deposition (CVD) in the presence of a catalyst. The latter has the greatest potential for production of nanotubes. Used catalysts are transition metals such as Fe, Ni and Co or its oxides. An example of this process is described in U.S. Pat. No. 7,338,648 of Apr. 3, 2008, according to which carbon nanotubes are obtained by a flow of methane over a catalyst of Fe/Mo supported on alumina, in an inert gas atmosphere.

Carbon nanospheres have also been obtained from a variety of pure hydrocarbons (solid, liquid or gas), using CVD technique, with and without catalyst, as shown in: Miao, J. et al. Carbon, 2004, 42, 813-822; Serp, R. K. P. et al. Carbon, 2001, 39, 615-628; Sharon M. et al. Carbon, 1998, 36, 507-511; Jin, Y. et al. Carbon, 2005, 43, 1944-1953; and Qian, H. et al. Carbon, 2004, 42, 761-766. The carbon precursor is typically fed into the gas phase to a tubular furnace under inert atmosphere, affecting the nucleation and formation of nanospheres under certain appropriate conditions.

The production of carbon nanomaterials (nanospheres and nanofilaments) by the CVD technique is well established in the literature for different hydrocarbon gases (such as methane and acetylene) as taught in: Baker, R T K—Catalytic growth of carbon filaments—Carbon 27, 315-323, 1989; Levesque, A. et al. Monodisperse—Carbon nanopearls in a foam-like arrangement: a new carbon nano-compound for cold cathodes—Thin Solid Films 464-465, 308-314, 2004. It is is well establish for liquids (such as benzene, toluene and xylene) in: Endo, M.—Grow carbon in the vapor phase—Chemtech 18, 568-576, 1988 Jin, Y Z et al.—Large-scale synthesis and Characterization of carbon spheres prepared by direct pyrolysis of hydrocarbons—Carbon 43, 1944-1953, 2005. And it is well established for solids (such as camphor) in: Sharon, M. et al.—Spongy carbon nanobeads: a new material—Carbon 36, 507-511, 1998; Musso, S. et al.—Growth of macroscopic carbon nanotube mats and Their mechanical properties—Carbon 45, 1133-1136, 2007.

Asphalt has been used for the production of nanospheres without catalysts [Liu, X. et al.—Fuel Processing Technology 87 (2006) 919-925] but because it is a solid material it involves difficulties in controlled and continuous feeding the process.

The use of mixtures of hydrocarbons for the production of nanospheres is potentially advantageous for allowing the use of materials of lower value, but very few have succeeded.

The use of mixtures of hydrocarbons as carbon precursors, especially those derived from petroleum, was successful only from light fractions and easy to be vaporized like kerosene [Kumar, M. et al.—Synthesis of conducting fibers, nanotubes and thin films of carbon from commercial kerosene—Materials Research Bulletin 34, 791-801, 1999] and solid products such as asphalt [Liu, X. et al.—Deoiled asphalt carbon source for the Preparation of various carbon materials by chemical vapor deposition—Fuel Processing Technology 87, 919-925, 2006; Yang, Y. et al.—Preparation of vapor-grown carbon fibers from deoiled asphalt—Carbon 44, 1661-1664, 2006].

However, some drawbacks can be observed immediately: the lighter fractions of petroleum present a high commercial value, so their use as feedstock for producing nanomaterials would add lower value to the process. Moreover, the use of a solid carbon precursor presents a series of difficulties, both to maintain a continuous supply and to control the composition fed to the process.

The aim of present invention is the use of heavy oil fractions as feedstock for the production of carbon nanomaterials (nanospheres and nanofilaments), to allow both to reduce the cost of these materials and add value to the heavy oil fractions of low commercial value. However, since they are liquids with high viscosity and low volatility, these fractions can not be fed to the process by methods commonly employed in the CVD technique: simple vaporization or aerosol formation.

SUMMARY OF THE INVENTION

The present invention relates to the production of carbon nanomaterials, using the technique of chemical vapor deposition (CVD) for processing heavy oil fractions, obtained from petroleum refining, as carbon precursor.

Other liquid fractions from petroleum, being subject to flash vaporization, can also be used as feedstock.

The method employs an arrangement that can operate continuously or in batch, using vertical or horizontal tubular furnace; the method comprising the following steps:
 a) Vaporizing a carbon precursor, consisted of a heavy oil fraction, which may have dissolved therein an organometallic catalyst, so as to provide pulses of vapor of constant composition being swept by a flow of inert gas into a tubular furnace;
 b) Forming nanomaterials from decomposition of the carbon precursor into an alumina tube maintained at a temperature between 700° C. and 1200° C. into the tubular furnace;
 c) Collecting the product continuously, when using a vertical tubular furnace, or in batch when using a horizontal tubular furnace.

DETAILED DESCRIPTION OF THE INVENTION

In order to make the invention better understood, examples are provided for illustrative purposes only.

Liquid heavy oil, obtained as a byproduct of petroleum pitches production from decant oil, can be successfully employed for the production of carbon nanospheres with high purity, by CVD technique, without the use of catalysts.

This means that the disposal of such liquid heavy oil fraction is no longer an environmental problem, since in addition to using the heavy oil as a raw material, there is an economic advantage in combining pitch production with carbon nanospheres production Liquid heavy oils from decant oils are therefore an advantageous carbon precursors for production of carbon nanospheres, since, besides the low cost, they have high carbon content (about 90% of carbon in decant oil) and they are obtained in large amounts in the processes of petroleum refining.

The method for obtaining nanomaterials (nanospheres and nanotubes), object of the present invention, basically comprising the following steps:

a) Vaporizing a carbon precursor, consisted of a heavy oil fraction, which may have dissolved therein an organometallic catalyst, so as to provide pulses of vapor of constant composition being swept by a flow of inert gas into a tubular furnace;

b) Forming nanomaterials from decomposition of the carbon precursor into an alumina tube maintained at a temperature between 700° C. and 1200° C. into the tubular furnace;

c) Collecting the product continuously, when using a vertical tubular furnace, or in batch when using a horizontal tubular furnace.

The production of nanospheres is accomplished by the vaporization of a carbon precursor, which is swept by a controlled flow of inert gas, typically nitrogen, to the interior of a tubular furnace, maintained at a temperature between 700° C. and 1200° C., preferably between 800° C. and 1100° C.

Figure 1:
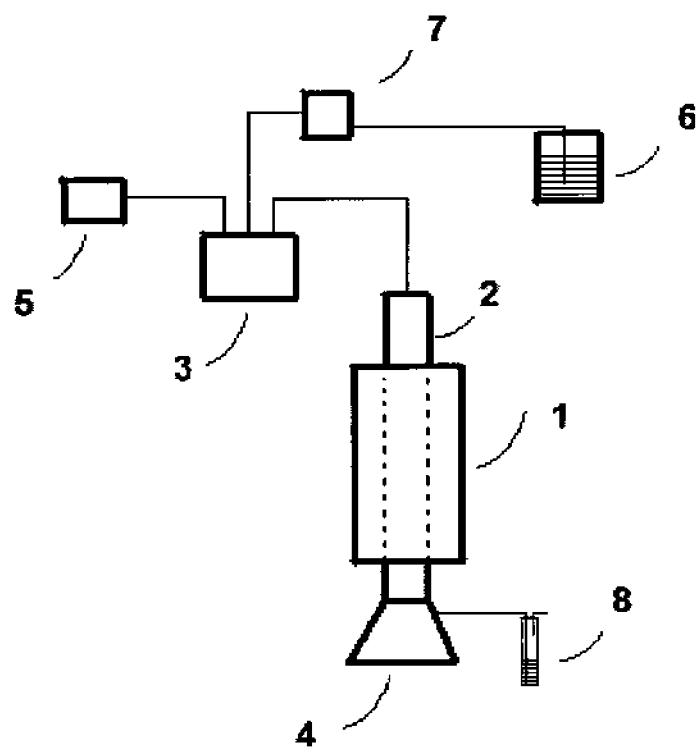
FIG. 1 shows an arrangement used for the invention.

In FIG. 1 it is illustrated an arrangement with a vertical tubular furnace for applying the process continuously. The arrangement includes a vertical furnace (1) having an alumina tube (2) inside, a heating chamber (3) for vaporizing the carbon precursor, and a device (4) for collecting nanoparticles. To the heating chamber (3) an inert gas (5) inlet is connected, provided with adequate flow controllers, and also a supply (6) of carbon precursor is provided with devices such as a peristaltic pump (7). The device (4) for collecting produced nanomaterials may additionally be connected to a particle retention system (8).

The vertical furnace allows the nanomaterials to be collected by gravity, in a continuous operation.

According to prior art, the liquid carbon precursors used in CVD processes are generally vaporized by bubbling inert gas in the carbon precursor or by injecting the liquid in a gas stream, or by a simple heating of a quantity of the carbon precursor in batch. In the present invention, the two methods are not applied, firstly due to the high viscosity of the carbon precursor applied, and secondly because the carbon precursor is a mixture of hydrocarbons to which a simple heating would lead to changes in the composition of the vapor in the process.

Therefore, to solve the problem, the carbon precursor is pumped into a heating chamber (3), where it is dripped onto a surface maintained at a temperature high enough to flash vaporize each drops of the feedstock.

Drip feed has already been suggested in studies of production nanofilaments, but with the direct injection of the droplets inside the reactor through a capillary needle, and in order to optimize the productivity of the catalyst (Fe or Ni). Kerosene was used as raw material whose compositions are quite different from these heavy oil fractions of present invention.

A typical catalyst employed for the production of nanofibers is ferrocene [$Fe(C_2H_5)_2$], when dissolved in the precursor to effect simultaneous vaporization (floating catalyst method). This technique can, therefore, also be employed in the production of nanofibers from heavy fractions of petroleum, similarly to that observed with the use of asphalt [Liu, X. et al.—Deoiled asphalt carbon source for the Preparation of various carbon materials by chemical vapor deposition—Fuel Processing Technology 87, 919-925, 2006.

According to the process of the present invention the carbon-precursor must be vaporized in a controlled manner, for example, by using a peristaltic pump (7) and means of controlling the flow of inert gas (5), to provide vapor pulses of constant composition into the tubular furnace where the production of nanomaterials occurs. The carbon precursor (6) is continuously pumped to a vaporization chamber (3), in which it is dripped onto a surface (not shown in the FIG. 1) heated to a temperature high enough to ensure flash vaporization, in which the vapor is swept by an inert gas flow (5) into the alumina tube (2) inside the tubular furnace (1).

If nanofilaments are to be produced, a suitable organometallic catalyst such as ferrocene, should be dissolved in the carbon precursor, so as to enable the creation of centers of growth of these nanofilaments.

Inside the tubular furnace (1), the alumina tube (2) is maintained at a temperature between 700° C. and 1200° C., preferably between 800° C. and 1000° C., where the decomposition of the carbon precursor occurs with the production of nanomaterials whose properties depend on: temperature, residence time, concentration of the carbon precursor in the gas flow, and catalyst concentration if used.

If the tubular furnace (1) is vertical, the product can be collected continuously in a device (4) from the lower end of the alumina tube (2). If the oven is operated in a horizontal position, the product can be obtained in batch and, if desired, on a suitable substrate. These features allow the production of various types of nanomaterials, such as nanotubes, nanofibers and other nanofilaments, nanofilms, laminates, among others.

In any case, as the product has extremely low density, it is desirable to adapt a system for retention (8) of particles at the furnace outlet, thereby avoiding loss of particles being swept by the flow of gas.

To better evaluate the production of nanomaterials, the object of this invention, illustrative examples are presented below, which, however, should not limit the invention. Similarly, the evaluation of the properties of nanospheres obtained by the process of the invention is presented.

Process of Preparing Nanospheres

Example 1

Figure 2:
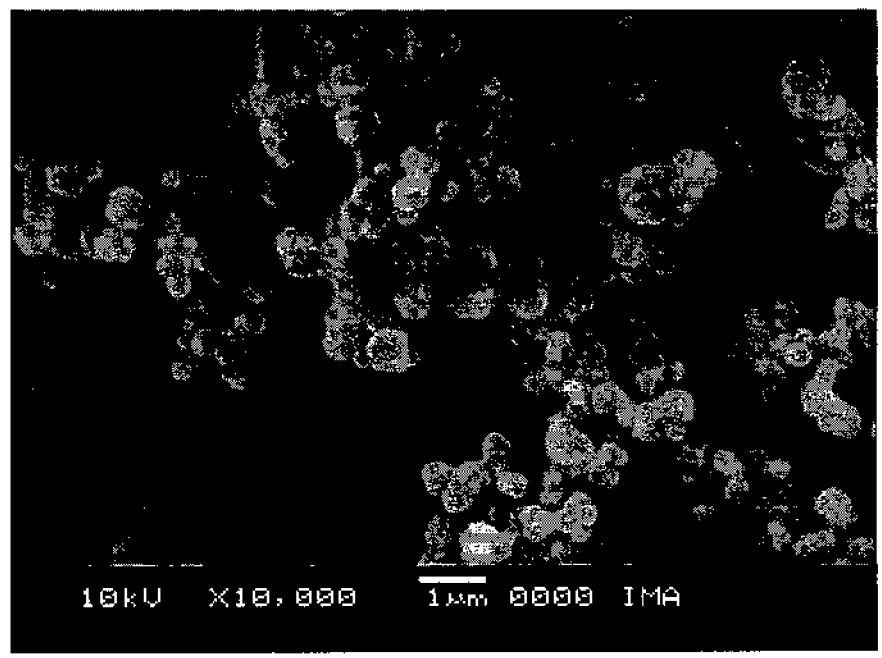
FIG. 2 shows carbon nanospheres obtained on a quartz substrate.

In an horizontal tubular furnace with an alumina tube of about 5 cm (2 inches) internal diameter, maintained at 1200° C., a decanted oil was fed at a flow rate of 7 mL/h in a stream of nitrogen 1 L/min for 30 min. Carbon nanospheres were obtained on a quartz substrate, and FIG. 2 shows the nanospheres obtained. In the absence of a particle retention system, 0.046 g of the nanomaterial was collected, and most of it was swept by the gas flow.

Example 2

In a vertical tubular furnace with an alumina tube of about 5 cm (2 inches) internal diameter, maintained at 1100° C., a decanted oil was fed at a flow rate of 15 mL/h swept by a flow of argon at 4 L/min for 120 min. In the outlet of the furnace a particle retention system was adapted, and 13.1 g of carbon nanospheres were collected.

Tribology Evaluation of Carbon Nanospheres

Example 3

The carbon nanospheres can be used for tribological purposes, in order to reduce friction and wear between two surfaces under mechanical contact. Currently, new high-performance lubricants have been developed in order to obtain an increase in energy efficiency.

For the evaluation of friction and wear, a commercial automotive oil for internal combustion engines, and specification API SL SAE 20W50, was compared with another of same viscosity grade, made of only the base oil and carbon nanospheres obtained according to the invention.

Figure 3:
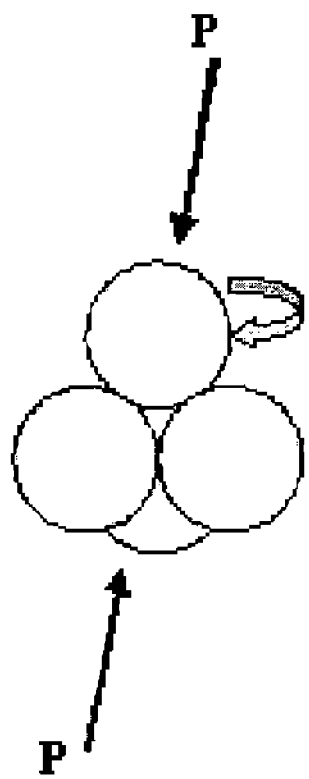
FIG. 3 illustrates the configuration of the equipment used for tribological evaluation of carbon nanospheres.

The equipment used in the test was a four ball tribometer, whose mechanism of operation is shown schematically in FIG. 3.

In the equipment, three balls are fixed within a reservoir, into which it was introduced a lubricant to be tested. A fourth ball was fixed on the movable shaft of an electric motor. Initially, it was applied a load among the three balls and other movable ball and the temperature of the oil bath was controlled in the desired set.

The electric motor, when activated, controls the rotation. After stabilizing all parameters, a clutch is powered, and start a rapid transmission of movement between the spheres in contact.

The oils with carbon nanospheres were prepared with the 0.05%, 0.10%, 0.35% and 0.50% wt of nanosphere. A load of 40 kgf, rotation of 1500 rpm, and initial temperature of 60° C. were applied. The test started, the temperature controller was turned off, and the thermal evolution in the oil bath was monitored due to friction between surfaces under contact, during 30 minutes. The scars of wearing, the friction and the temperature were measured.

Figure 4:
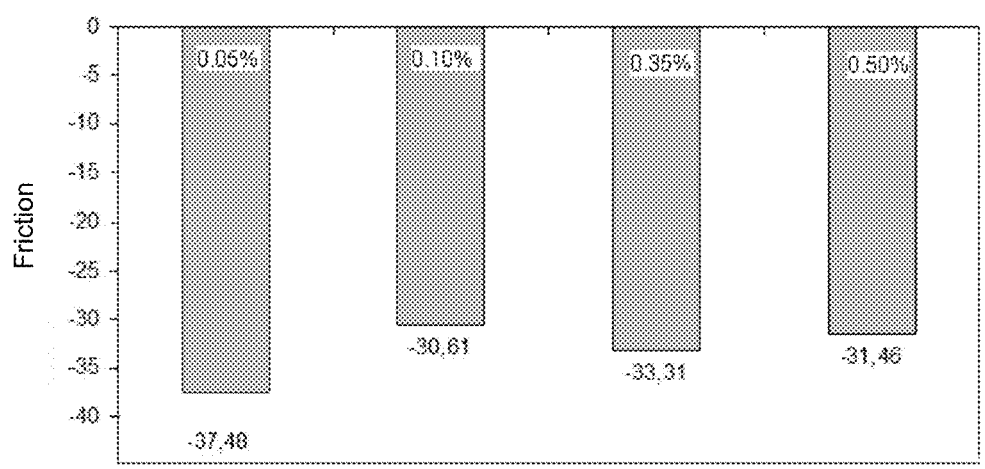
FIG. 4 shows a friction comparison between oils prepared with carbon nanospheres and a commercial oil.

FIG. 4 presents the results of increased friction comparison between the prepared oils with carbon nanospheres at different concentration.

One can observe a significant reduction of friction in comparison with the commercial oil. The highest performance for the oil prepared with the lowest concentration of nanospheres may suggest that the mechanism of action between the surfaces under contact, is related to rolling the nanospheres.

Figure 5:
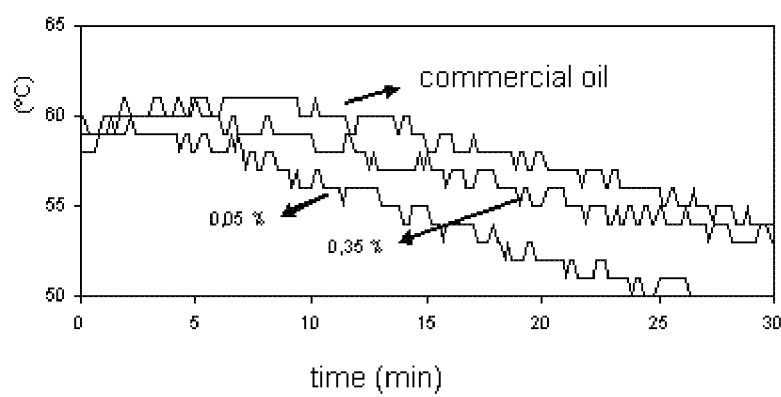
FIG. 5 shows temperature profiles for oils prepared with carbon nanospheres and a commercial oil used in the test.

FIG. 5 shows the temperature profiles for oils prepared with nanospheres. It may be noted that the final temperature was the lowest of all of prepared oils with the lowest concentration of nanospheres. The highest end temperature was reached by the commercial oil. This behavior shows that prepared oils with carbon nanospheres lead to greater energy efficiencies, which is a major issue at present for dynamic equipment.

The invention claimed is:

1. A method for producing carbon nanospheres, the method employing heavy oil obtained from decant oil as a carbon precursor, and using the technique of chemical vapor deposition to obtain carbon nanospheres, the method comprising:
   a) pumping the carbon precursor to a vaporization chamber in which it is dripped onto a surface heated to and maintained at a temperature at which the carbon precursor drop is completely vaporized, simultaneously being swept by a controlled flow of inert gas to provide pulses of vapor of constant composition into a reaction chamber of a tubular furnace;
   b) forming carbon nanospheres from decomposition of the carbon precursor into the reaction chamber into an open alumina tube maintained at a temperature between 700° C. and 1200° C.; and
   c) collecting the carbon nanospheres continuously, when using a vertical tubular furnace, or in a batch, when using a horizontal tubular furnace.

2. The method for producing carbon nanospheres according to claim 1, wherein
   the tubular furnace is at a temperature between 800° C. and 1100° C.

3. The method for producing carbon nanospheres according to claim 1, wherein the tubular furnace is in a vertical position.

4. The method for producing carbon nanospheres according to claim 1, wherein the tubular furnace is in a horizontal position.

* * * * *